United States Patent [19]

Pitcairn

[11] E Patent Number: Re. 33,768

[45] Reissued Date of Patent: Dec. 17, 1991

[54] WATER SKI CONSTRUCTION

[76] Inventor: Ian C. Pitcairn, 11909 SE. 171st St., Toquesta, Fla. 33469

[21] Appl. No.: 516,464

[22] Filed: Mar. 21, 1990

Related U.S. Patent Documents

Reissue of:

[64] Patent No.: 4,629,435
Issued: Dec. 16, 1986
Appl. No.: 777,193
Filed: Sep. 18, 1985

U.S. Applications:

[63] Continuation of Ser. No. 197,308, May 17, 1988, abandoned.

[51] Int. Cl.[5] ..... A63C 15/00

[52] U.S. Cl. ..... 441/68; 114/290; 441/74

[58] Field of Search ..... 114/288-291; 441/65, 66, 68, 74, 76, 79; 180/180, 182, 186

[56] References Cited

U.S. PATENT DOCUMENTS

| | | | |
|---|---|---|---|
| 2,423,796 | 7/1947 | Platt | 114/290 |
| 3,077,617 | 2/1963 | Steffel | 441/68 |
| 3,568,617 | 3/1969 | Yost | 114/291 |
| 3,827,096 | 8/1974 | Brownson | 441/68 |
| 3,950,807 | 4/1976 | Sharpe | 441/68 |
| 3,996,869 | 12/1976 | Hadley | 114/291 |
| 4,193,370 | 3/1980 | Schoell | 114/291 |
| 4,386,982 | 6/1983 | Weinhaus | 441/68 |

*Primary Examiner*—Joseph F. Peters, Jr.
*Assistant Examiner*—Clifford T. Bartz
*Attorney, Agent, or Firm*—Harry W. Barron

[57] ABSTRACT

There is disclosed a water-ski construction in which there is provided an elongated element having an upper and lower surface. The lower surface is divided, in the longitudinal direction, into a fore zone, a mid-zone, and an aft-zone, the lower surface of the element being adapted for contact with water. The fore-zone is designed by a single concave surface the nature of an arrow-like depression. The mid-zone is defined by first and second concave longitudinal channels separated by a sharp edge. The longitudinal channels extend throughout the mid-zone of the ski and into the aft-zone. The mid-zone further includes a flat surface which defines and frames the outer periphery of both the fore and mid-zones of the elongated ski element, thusly defining the outer transverse extent of the longitudinal channels. The depth of the concave longitudinal channels progressively deepens at the mid-zone and lessens at both the aft and fore zones. The above set forth contour of the lower surface of the ski operates to afford enhanced control and maneuverability to the water ski.

10 Claims, 3 Drawing Sheets

WATER SKI CONSTRUCTION

Matter enclosed in heavy brackets [ ] appears in the original patent but forms no part of this reissue specification; matter printed in italics indicates the additions made by reissue.

*This is a continuation of application Ser. No. 07/197,308 filed 5/17/88, now abandoned.*

BACKGROUND OF THE INVENTION

The field of this invention relates to the construction of water skiis and, more particularly, to water skiis particularly adapted for maneuverability and stability over a broad range of operating conditions, particularly including low speeds.

The prior art in the area of water skiis relate primarily to narrow elongate structures having a generalized resemblance to snow skiis. Such designs follow the conventional wisdom to the effect that an ideal water ski should be in the form of a long flat body having a broad running surface and, further, be light weight and durable.

The prior art as best known to the inventor in the above regard is reflected in U.S. Pat. No. 3,027,575 (1962 to Fortin; U.S. Pat. No. 3,744,254 (1974) to Meyer; and U.S. Pat. No. 3,827,096 (1974) to Brownson.

The above-referenced prior art reflects the only attempts known to the inventor involving the [modificiation] *modification* of the normally flat lower surface of the water ski to alter the fluid dynamic behavior of the ski itself. The invention may therefore be considered as an improvement over these attempts in order to achieve a resultant ski having improved characteristics of maneuverability and stability over those designs known in the prior art.

The present skiboard can be used in tow behind any boat in any waterway or, alternatively, in use in wave jumping. Wave jumping of six feet is easily accomplished through the use of the disclosed water ski.

The inventive water ski has been found to plant quickly and to afford considerable ease in turning.

The skiboard is also useful in maneuvers such as deep water starts, kickouts, bottom turns, off-the-lip turns, and high jumping.

The cruising speed of the disclosed water ski is faster than a surfboard but slower than that of a knee board and, also, slower than that of a slalom ski as, for example, is disclosed in the above-referenced patent to Brownson.

SUMMARY OF THE INVENTION

The invention relates to a water ski design comprising an elongated element having an upper and lower surface, the lower surface divided in the longitudinal direction into a fore zone, a mid-zone and an aft zone, the lower surface thereof adapted to contact the water. The fore zone defines a single concave surface in the nature of an arrow-like depression, the point of which arrow of said depression is directed along the major axis of the ski and in the direction of intended travel thereof. The mid-zone is defined by first and second substantially parallel concave longitudinal channels separated by a sharp edge of arcuate intersection between said first and second channels. The channels and their common edge extend throughout the mid-zone and into the aft zone of the ski. The mid-zone further includes a surface which defines and frames the outer periphery of both said fore and mid-zones of said elongated element. Thereby, the outer transverse extent of said longitudinal channels is defined. The aft-zone of the ski includes said pair of concave channels but, however, does not include said mid-zone surface. In the aft-zone, the entire ski is tapered transversly inward to reduce it, at the end of the aft-zone, to a zero width. The radial depth of the longitudinal channel progressively deppens toward the middle of the mid-zone and progressively lessens toward said aft-zone. The radial depth of single concave surface within the fore-zone is shallow as compared to the radial depth of the longitudinal channels within the mid-zone.

It is an object of the present invention to provide a water ski having enhanced stability as compared to skis known in the prior art.

It is another object to provide a water ski which will have enhanced stability at low speeds, e.g., 20 miles per hour.

It is a further object to provide a ski having enhanced ease of turning.

It is a yet further object to provide a water ski which will afford better ease of jumping and stability in connection therewith.

It is a further object to provide a water ski which will enable rapid acceleration of the ski and its rider.

It is another object to provide a water ski having improved maneuvering capability over skis known in the prior art.

The above and yet other objects and advantages of the present invention will become apparent in the hereinafter set forth Detailed Description of the Invention, the Drawings, and the claims appended herewith.

DETAILED DESCRIPTION OF THE INVENTION

Figure 1:
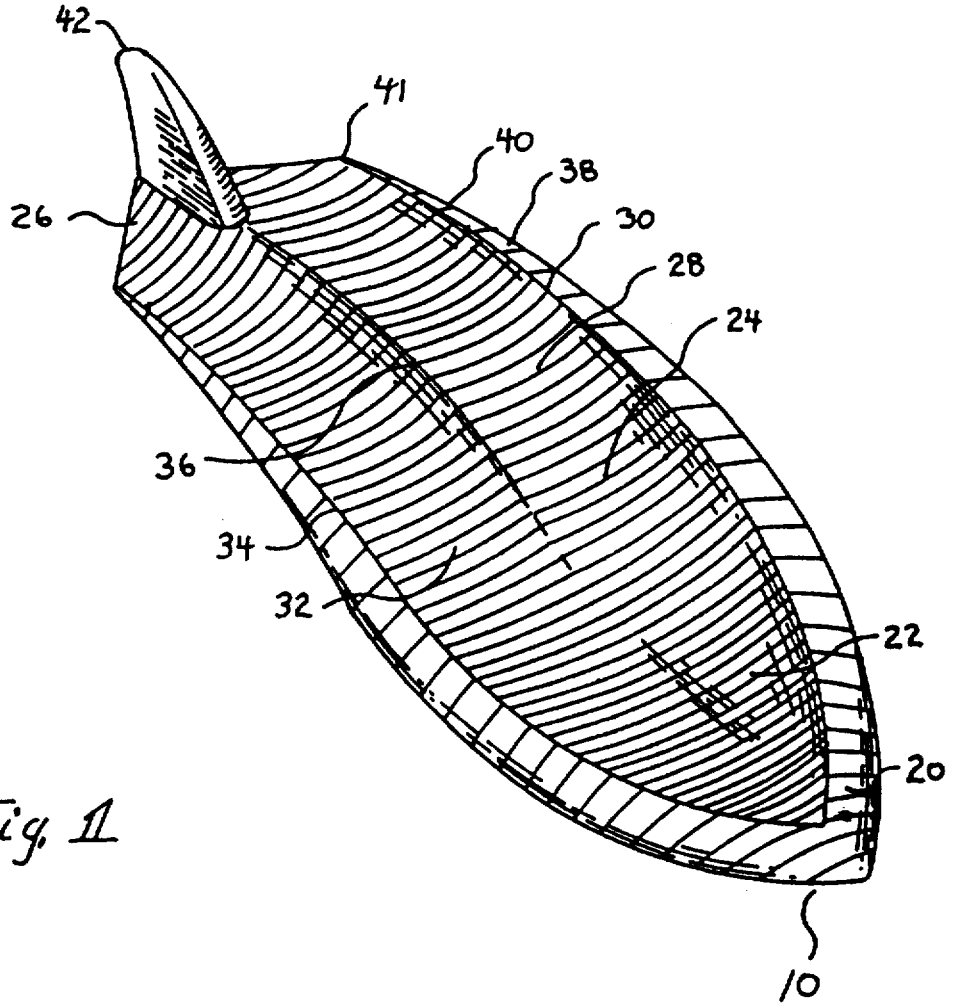
FIG. 1 is a perspective view of the lower surface of the present inventive water ski.

Referring to FIG. 1, there is shown a water ski 10, according to the present invention, having an upper surface 12 and a lower surface 14. The detail of FIG. 1 is that of the lower surface 14.

The ski is generally separated into three areas, namely, a fore zone 20, a mid-zone 24, and an aft-zone 26 sometimes known as the tail of the ski. As may be noted in FIG. 1 and, as well, the bottom plan view of FIG. 2, the outline or periphery of the ski is defined by a narrow planar surface 38. As may be seen in FIGS. 1 and 2, the surface 38 begins at the front or fore zone 22 of the ski and continues, thru the mid-zone, and ends at point 41, this reflecting the end of the mid-zone and the beginning of the aft-zone. The line of intersection between mid-zone surface 38 and upper surface 12 is termed the rail line 40 by which the outermost extent of the ski is defined.

The inner dimension of the surface 38 is defined by edges 30 and 34 which represent the outer edges of a first concave longitudinal channel 28 and a second concave longitudinal channel 32. Thereby, edges 30 and 34 serve to define the spherical intersection between flat 38 with first channel 28 and second channel 32.

Between the two longitudinal channels, which substantially define the mid-zone of the ski, is a common inner edge of keel 36 (see also FIG. 6) which edge is defined by the intersection of the two solids of rotation which define the first channel 28 and second channel 32.

Figure 5:
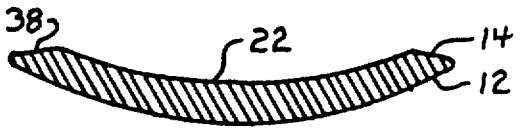
FIG. 5 is a transverse cross-sectional view taken along Line 5—5 of FIG. 2, thru the fore zone of the ski.

It is to be appreciated that the shape of the fore zone 20 (See FIGS. 2 and 5) is adapted for sharp entry into the water.

Figure 6:
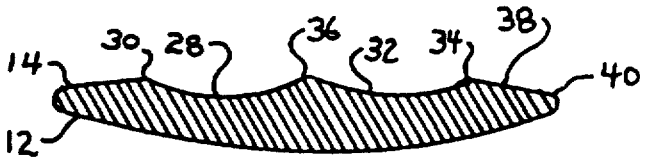
FIG. 6 is a transverse cross-sectional view taken along Line 6—6 of FIG. 2 thru the mid-zone of the ski.
Figure 7:
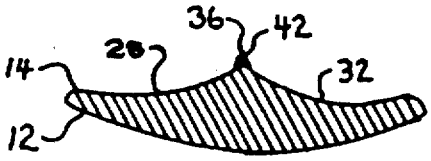
FIG. 7 is a transverse cross-sectional view taken along Line 7—7 of FIG. 2 thru the aft zone of the ski.
Figure 8:
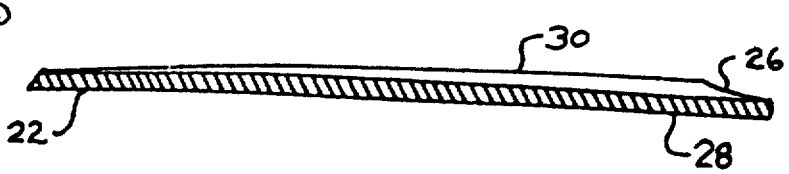
FIG. 8 is a longitudinal cross-sectional view taken along Line 8—8 in FIG. 2 and in FIG. 6.

With reference to the cross-sectional views of FIGS. 6 and 7, it may be noted that the greatest depth of the channels 28 and 34 occurs at the center of the mid-zone 24, while the depth thereof reduces or "shallows out" substantially at the aft-zone 26 of the ski. Also, the depth of the radius of the fore zone 20 is shallow as compared to the radial depth of the channels 28 and 32. The change in radial depth, from the shallower fore zone, to the deeper mid-zone, and then to the shallower aft-zone, is one of gradually changing progression of depth. This is illustrated in the longitudinal cross-sectional view of FIG. 8 in which the greater radial depth of the concave depressions in the mid-zone of the ski, relative to the fore and aft zones, may be seen.

Figure 3:
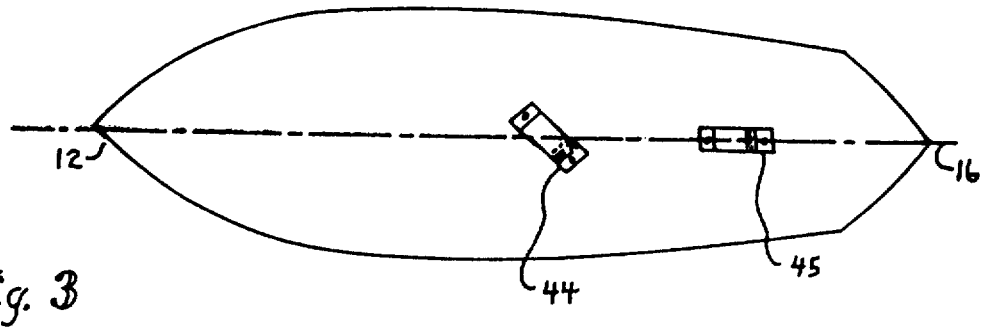
FIG. 3 is a plan view of the upper surface of the ski.
Figure 4:
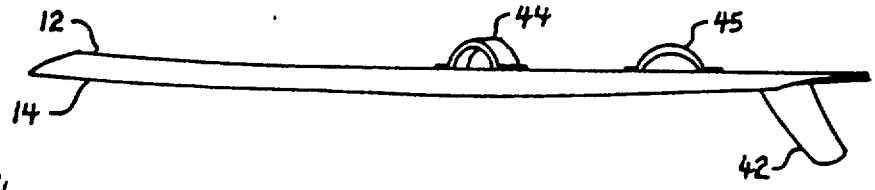
FIG. 4 is a side elevational view of the ski.

With reference to the top view of FIG. 3 and side view of FIG. 4, there may be seen footstraps 44 and 45, as well as stabilizing fin 42. Also, the upward curvature of the surfaces 12 and 14 toward the fore zone of the ski may be clearly seen in the view of FIG. 4.

In a preferred embodiment, the longitudinal length of the ski will be about 66 inches, while the greatest transverse width, i.e., that along Line 6—6 will be about 16 inches.

Considering the operation of the inventive water ski, during periods of acceleration the water is conducted through the mid-zone 24 and is laterally restrained within channels 28 and 32 of the mid-zone. As water passes through said channels in the mid-zone, air is entrapped which tends to facilitate low frictional movement of the ski through the water during periods acceleration and planing. Additionally, air flows through the channels 28 and 32 to produce a hydrofoil effect which facilitates acceleration of the ski through the water. This design will cause the ski to "sit" lower in the water, enhancing stability and reducing buoyancy.

Deceleration is accomplished when the aft-zone 26 is displaced downward into the water. Thereupon it is not possible for water or air to travel the full length of the channels 28 and 32 within the mid-zone, thus inhibiting the escape of water from the lower surface of the ski. This increases the water pressure against the bottom of the ski, thusly rapidly decreasing the forward progress of the ski, enabling the skier to slow down in a shorter space of travel than is generally possible with conventional axis.

The particularly beneficial characteristics of maneuverability of the present ski are obtained by virtue of the large ratio of the minor axis 18 to the major axis 16. This ratio being, for example, in the range of 0.18 to 0.30. In practical terms, this large ratio means that the present inventive ski is much wider than are prior art of water skis. One benefit of this design modification is that powerful muscle groups of the skier can be employed in the turning function. In other words, much better position or leverage; the feet and legs of the skier can be obtained with a wider bodied ski.

The maneuverability of the present ski is also enhanced by reason of the present inventive design of the mid-zone surfaces 38 extending, as above noted, through both the fore and mid-zone of the ski. The [sharp flat] line 40 which is formed at the intersection between the flat 38 and the upper surface 12 increases the accuracy of turning which can be accomplished in using the present ski.

An additional advantage, derivitive of the stability obtained by the combination of the above-described concave channels 22, 28 and 32 is the ability of the ski to jump often up to heights of six feet. Otherwise, the channel structure permits sufficient acceleration for jumping purposes, and the flats 38, with its clearly defined [flat] line 40, provides for maneuverability and stability, upon landing, after such water ski jumping has occurred.

Another inventive feature herein is the long curve, shown in FIG. 4, by which the fore-zone 20 curves upward relative to the aft-zone 26. In the prior art, the upward curve of the fore-zone relative to the aft-zone is more abrupt than that disclosed herein. The elevation of the curve is 4.0 inches over a length of the entire ski, that is, a lift of 0.7 inches per running foot of length.

With reference to FIG. 7 it is noted that the sharp V-shaped intersection defining Line 36 and the curves of channels 28 and 32 on either side thereof, is the equivalent of a V bottom on a boat and, as such, provides particular stability to the ski in its mid-zone, apart from the stability derived from the surfaces 38 above described. The configuration of FIG. 7 is also very helpful in accomplishing stable turning of the ski.

Figure 2:
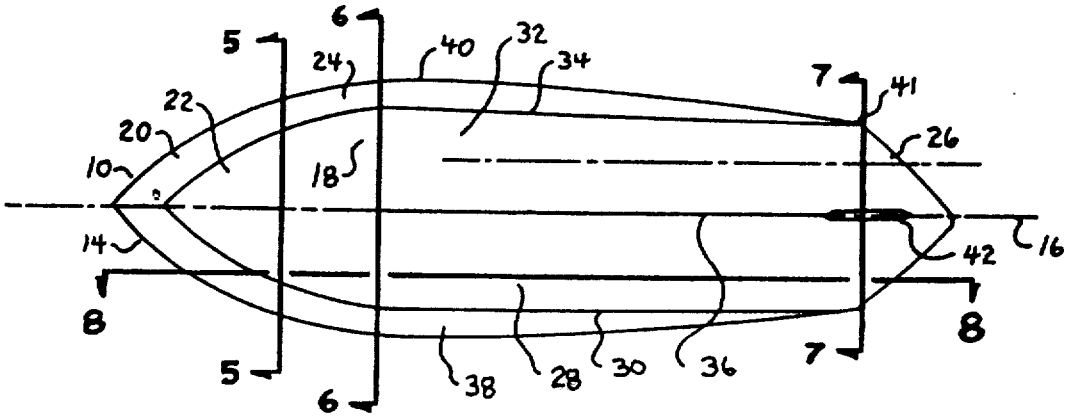
FIG. 2 is a plan view of the lower surface of the ski.

It is further noted that the point of maximum transverse bulge, this corresponding to the point of cross-section 6—6 of FIG. 2 acts to maximize the jumping capability of the ski.

It is further noted that the rapid transition from the fore zone 20 to the mid-zone 24 has, particularly, in choppy water, the effect of cutting by Line 36 into the water and, thereby, forcing of channels 28 and 32 in the water to achieve a suction-like effect, which with the surfaces 38, provide enhanced low speed stability to the ski. The deep radius of channels 28 and 32 in the mid-zone is helpful during turning in that they effectively achieve a biting effect, thusly making sharper turns much easier to execute. Typically, the radius of the channels 28 and 32 are appropriately 10 inches at the Line 6—6 of greatest transverse width.

The water ski is, in a preferred embodiment, made with a foam core such as polyurethane, covered by a thin tough skin such as a polyester resin. The weight of the ski is in the range of seven to ten pounds.

In a further embodiment, the plane of the mid-zone surfaces 38 (see FIGS. 5 and 6) may define a larger included angle relative to the plane of the upper surface 12. This will present more of a V-shaped angle of attack of the lower surface 14 into the water, thus providing enhanced stability.

Accordingly, while there has been shown and described the preferred embodiments of the present invention, it is to be understood that the invention may be embodied otherwise than is herein specifically illustrated and described and that, within such embodiments, certain changes in the detail of construction and the form and arrangement of the parts may be made without departing from the underlying idea or principles of this invention within the scope of the appended claims.

I claim:

1. A water ski construction, comprising:

(a) an elongated element having an upper and lower surface, said lower surface divided *along the major axis of said ski*, in the longitudinal direction, into a fore zone, a mid-zone, and an aft-zone, the lower surface thereof adapted to contact water,

[(b) said fore zone defining a single concave surface in the nature of an arrow-like depression, the point of the arrow of said depression directed along the major axis of said ski and in the direction of intended travel thereof, (c)] (*b*) said mid-zone defining first and second concave longitudinal channels separated by [a sharp] *an* edge of [arcuate] intersection between said first and second channels, said channels and said edge extending throughout said mid-zone and into said aft-zone, said mid-zone further including a surface which defines and frames the *entire* outer periphery of [both] said [fore- and mid-zones] *mid-zone* of said elongated element and, thereby, the outer transverse extent of said longitudinal channels, said transverse extent defining the minor axis of the ski,

[(d)] (*c*) said aft-zone including *an extension of* said pair of concave channels, absent said mid-zone [surfaces,] *surface, and*

[(e)] (*d*) the aft-zone tapered transversely inward to reduce, at its end, [to zero] the transverse width of the ski, [and (f) the radial depth of said longitudinal channels progressively deepening at the mid-zone and lessening at said aft-zone as well as at the single concave surface of said fore-zone], whereby the above-defined contour of the lower surface operates to afford enhanced control and maneuverability of the ski.

2. The water ski construction as recited in claim 1 in which the ratio of the length of said minor axis of said ski to said major axis is in the range of 0.18 to 0.30.

3. The construction as recited in claim 2 in which the length of the ski is about 66 inches and the width thereof is about 16 inches.

4. The construction as recited in claim 2 in which the ski, along its major axis, exhibits an upward slope of about 0.07 inches per running foot of length of the major axis of said ski.

5. The construction as recited in claim 2 in which the radius of curvature of each of said first and second longitudinal channels is, at the center of the mid-zone of the ski, about 10 inches.

6. The construction as recited in claim 2 where the weight of the skis is in the range of 7 to 10 lbs.

7. The ski construction as recited in claim 2 in which the ski comprises a foam core surrounded by a rugged outer skin.

8. The construction as recited in claim 7 where the weight of the skis is in the range of 7 to 10 lbs.

*9. The invention according to claim 1 wherein said mid-zone edge of said intersection is lower in said water than said transverse extent.*

*10. The invention according to claim 1 wherein said concave longitudinal channels are of a gradually changing depth.*

* * * * *